United States Patent [19]  
Yamasaki et al.

[11] 3,863,500  
[45] Feb. 4, 1975

[54] FLOW VELOCITY MEASURING DEVICE
[75] Inventors: Hiroo Yamasaki; Ichizo Ito, both of Tokyo, Japan
[73] Assignee: Yokogawa Electric Works Ltd., Tokyo, Japan
[22] Filed: Apr. 5, 1973
[21] Appl. No.: 348,121

[30] Foreign Application Priority Data
Apr. 27, 1972 Japan.................................. 47-42472

[52] U.S. Cl............................................... 73/194 B
[51] Int. Cl........................... G01f 1/00, G01p 5/10
[58] Field of Search .................................... 73/194 B

[56] References Cited
UNITED STATES PATENTS
3,564,915  2/1971  Tomota et al. ....................... 73/194
3,722,273  3/1973  Yamasaki et al. .................... 73/194

*Primary Examiner*—Herbert Goldstein
*Attorney, Agent, or Firm*—Bryan, Parmelee, Johnson & Bollinger

[57] ABSTRACT

Flow metering apparatus of the type wherein a vortex generating element having a generally elongate cylindrical shape is placed transversely in the stream of flowing fluid to produce on opposite sides of the element vortices which are shed in alternating fashion, and of the type wherein the element is formed with openings at said opposite sides which are connected together through the interior of said element to produce therethrough an alternating fluid flow corresponding to the alternating shedding of vortices. To improve the correspondence of vortex production rate with flow velocity over conditions of turbulent flow, the element has the openings on opposite sides thereof arranged both in an upstream region, and in a downstream region circumferentially spaced from the upstream region. Fluid flowing into the openings on one side of the element serves to maintain the boundary layer attached to the element to the vicinity of the downstream region to aid vortex formation. Fluid flowing outwardly from the openings on the opposite side of the element assists in separating the boundary layer and in preventing it from reattaching to the element in the vicinity of the downstream region.

13 Claims, 7 Drawing Figures

FLOW VELOCITY MEASURING DEVICE

BACKGROUND OF THE INVENTION

1. Field of the Invention

This invention relates to flow metering apparatus of the type wherein a cylindrical object in a stream of flowing fluid produces a wake including a distinct pattern of vortices known as the Karman vortex street. The vortices are shed alternately from opposite sides of the object in a particular manner. There is a definite re-relationship between frequency f of shedding of the vortices, diameter D of the cylinder, and the velocity V of the stream, expressed by:

$$f = K \cdot V/D$$

where $K$ is a constant when flow is below a critical Reynolds number $R_c$ and where $k$ is a function of velocity $V$ above the critical Reynolds number. Accordingly, it is possible to determine the flow velocity $V$ by measuring the frequency $f$ of the generation of vortices, and the measurement is straightforward if the conditions of flow make $k$ a constant.

2. Description of the Prior Art

In actual flow measurement in pipelines and the like, turbulence is encountered to a certain extent. Generally, the turbulence increases as the velocity of fluid flow in the pipeline, and the Reynolds number, increase. The presence of turbulence in the flow reduces the critical Reynolds number $R_c$ at which laminar flow separation changes to turbulent flow separation. The presence of such turbulence thus reduces the range of linearity of flow measuring apparatus using a Karman's vortex generating element.

Various arrangements have been proposed for generating Karman's vortices more stably in a flow measurement environment. In one such arrangement disclosed in U.S. Pat. No. 3,564,915 to Myyaji Tomota, et., a cylindrical element is formed with a transverse bore or slot intercepting the cylinder surface in the regions where boundary layer separation normally occurs, with fluid flow alternating through the transverse bore or slot as the Karman's vortices are generated to assist or retard boundary layer separation for more reliable vortex production.

In another prior art arrangement, disclosed in U. S. Pat. No. 3,116,639 to Bird, a cylindrical object is formed with a cross sectional shape which reduces flow resistance at high speeds, and avoids deleterious effects on vortex production causes by cavitation, such shapes including a streamlined fore-part (such as a semi-ellipse) with the after part cut away and recessed.

In another prior art arrangement, disclosed in U.S. Pat. No. 3,693,438 to Hiroo Yamasaki et al., the cylindrical element is formed on opposite sides thereof with recessed surface portions meeting the upstream surface of the element in an edge which lies substantially where the boundary layer of the fluid separates from the element surface during low velocity conditions of flow. The edge forms an outer extremity of the element to fluid flow and compels boundary layer separation. This arrangement also can employ a transverse bore arrangement to further assist in controlling boundary layer separation.

Such prior art apparatus of the general type referred to above has not been fully satisfactory in providing a linear relationship between flow velocity V and the frequency $f$ of vortex generation. While gains have been made in avoiding measurement problems, deviations from linearity during conditions of turbulent flow and high velocity remain present. Although the causes of this disparity may not have yet been completely explained, it is believed to result from erratic boundary layer separation. If turbulence is present in the flowing fluid, a boundary layer separated from the vortex generating element may reattach itself, interfering with steady vortex production and causing the critical Reynolds number $R_c$ to be reduced. Likewise, with turbulence present in the flowing fluid, regular vortex production is difficult at high Reynolds numbers.

The prior art apparatus of the general type referred to above additionally sometimes necessitates a variety of different designs for different fluids, sometimes is sensitive to mounting angles relative to flow, and sometimes is influenced by acoustic noise sufficient to hamper measurements.

SUMMARY OF THE INVENTION

It is a principal object of this invention to provide improved elements for generating Karman's vortices, the frequency of shedding of which is to be detected to measure the velocity of fluid flow. It is specific object of the invention to provide a vortex generating element for which a linear relationship exists between flow velocity and frequency of vortex generation in conditions of turbulent flow. Still another object of the invention is to provide a vortex generating element of the type described which is more suitable for commercial use by being applicable to a substantial range of applications and which is insensitive to installation problems.

In a preferred embodiment of the invention to be described hereinbelow in detail, the element which is inserted in the flowing stream to produce on opposite sides of the element vortices which are shed in alternating fashion, and which is formed with openings at said opposite sides which are connected together through the interior of the element to produce therethrough an alternating fluid flow corresponding to the alternating shedding of vortices, has the openings on each of the opposite sides of the element arranged in an upstream region and in a downstream region which is circumferentially spaced from the upstream region. The openings comprise, for example, a longitudinal row of ports in the upstream region and one or more longitudinal rows of smaller ports in the downstream region. As vortices are generated, alternating pressure fluctuation causes fluid to flow through the upstream and downstream openings to control boundary layer separation. Fluid flowing out through the upstream and downstream openings on one side of the element aide in separating the boundary layer and prevents the separated boundary layer from reattaching to the element on the downstream side, thus avoiding a cause of non-linearity. Fluid flowing in through the upstream and downstream openings on the other side of the element maintains the boundary layer attached to the vicinity of the downstream region, to allow Karman's vortices to be sufficiently grown before they are shed.

This arrangement affords stable and regular production of Karman's vortices even if turbulent fluid flow is to be measured, without unduly lowering the critical Reynolds number $R_c$. The arrangement further is advantageous in that it can be used for both liquid and gas flow measurement without structural modifications and with minimum variations in types of devices needed for a substantial range of applications. Additionally, when installed, the vortex generating element requires no special care in determining its angle to flow direction.

Other objects, aspects and advantages of the invention will be pointed out in, or apparent from, the detailed description hereinbelow considered together with the following drawings.

DESCRIPTION OF THE PREFERRED EMBODIMENTS

Figure 1:
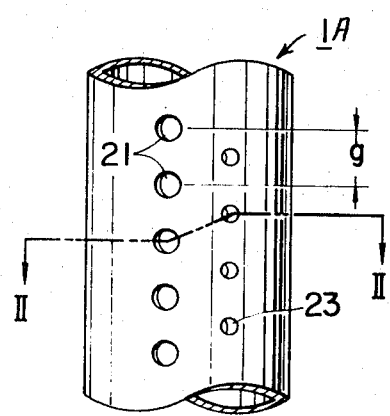
FIG. 1 is a partial elevation showing one form of the improved vortex generating element of the present invention.
Figure 2:
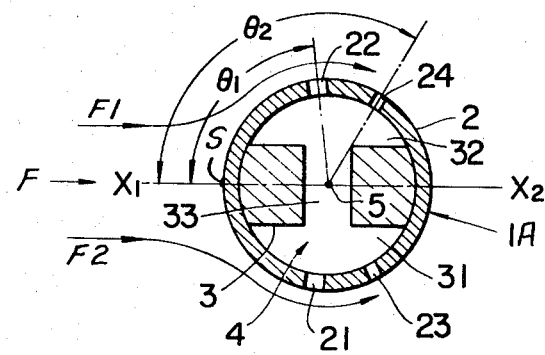
FIG. 2 is a cross section taken along line 2—2 of FIG. 1.

Referring first to FIGS. 1 and 2, showing a vortex generating element 1A according to the invention in a stream of flowing fluid F, it is known that the fluid F breaks into two streams F1 and F2 at the stagnation point S and these two streams flow along the surface of element 1A. The flow velocity at the surface increases as the flow moves away from the stagnation points, until the boundary layer of the fluids separates from the element surface at a separating point. Downstream of the separating point, vortices form alternately on opposite sides of element 1A to produce the characteristic Karman vortex street. The separating point of the boundary layer is not fixed, but periodically varies its position along the circumference of the vortex generating element as the alternating vortices are produced. As explained above, turbulence in flowing fluid F is believed to cause the boundary layer to separate erratically, interrupting the stable and regular production of vortices which provides a linear relationship between flow velocity V and frequency $f$ of vortex production.

The vortex generating element 1A, as shown in FIGS. 1 and 2, comprises a cylindrical body 2 and central partition 3 providing an interior chamber 4. The element 1A is formed on opposite sides thereof with openings in the form of longitudinal rows of ports 21, 22, 23 and 24. Each row of ports is arranged in a straight line parallel to the axis of element 1A, and communicates with a corresponding interior cavity 31, 32. These cavities are separated by central partition 3 which has an opening 33 serving as a passageway to accommodate the flow of fluid therebetween.

When vortices are shed from element 1A, corresponding pressure fluctuations are produced next to the sets of openings 21 through 24. Since the vortices are shed alternately from the opposite sides of the element, the pressures within cavities 31, 32 also will fluctuate in an alternating fashion. These pressure fluctuations cause fluid to be displaced (i.e., to flow) through the opening 33 in an alternating fashion first in one direction and then in a reverse direction. The rate of flow alternation is proportional to the rate of generation of vortices. A flow detecting device 5 is positioned in passageway 33 to detect the alternating flow therethrough. The detecting means 5 can be a known arrangement comprising an electrically heatable wire the ends of which are connected to a sensing circuit which produces a flow of electric current through the wire and also measures the change in resistance of the wire resulting from displacement of the fluid past the wire.

As indicated previously, when the flowing fluid F contains turbulence, separation of the boundary layer is no longer regular and detection of alternating flow by means of the flow detecting means 5 becomes nonlinear.

To overcome this problem and to provide for accurate measurement despite turbulence in flowing fluid F, the present invention positions the openings on the opposite sides of the element so that the rows of ports 21 and 22 lie relatively in the upstream region, and the rows of ports 23 and 24 lie relatively in a downstream region which is circumferentially spaced from the upstream region. Thus, as shown in FIG. 2, the upstream ports 21 and 22 lie at an angle $\theta_1$, and downstream ports 23, 24 lie at a larger angle $\theta_2$, measured from the openings to the element axis to the stagnation point S. In addition, as shown in FIG. 1, the element 1A has downstream ports 23 diametrally smaller than the upstream ports 21, and staggered in relation thereto, so that the downstream ports 23 lie in the middle of the axial distance g separating the upstream ports.

Figure 3:
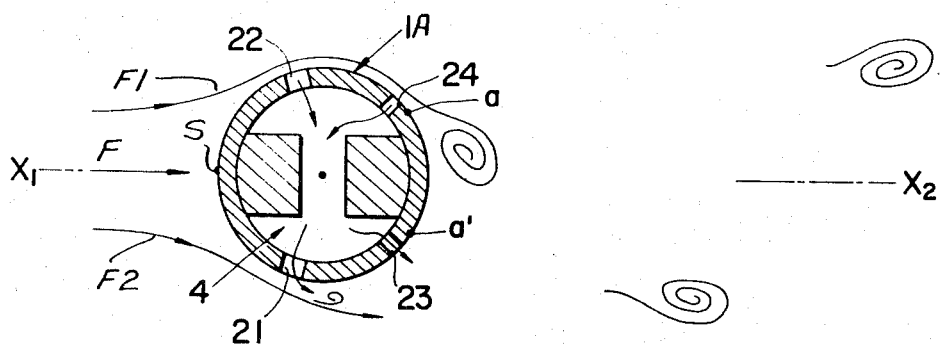
FIG. 3 is a cross section similar to FIG. 2 illustrating boundary layer control afforded by the vortex generating element of FIGS. 1 and 2.

Referring now to FIG. 3 the improved boundary layer control afforded by vortex generating element 1A is as follows. As a vortex is produced, fluid flows through the interior of element 1A, flowing inwardly on the high pressure side of element 1A (through ports 22 and 24 in FIG. 3), and flowing outwardly on the low pressure side of the element (through ports 21 and 23) as shown by the arrows in FIG. 3. The fluid flowing inwardly through upstream ports 22 and downstream ports 24 aids in maintaining the boundary layer of stream F1 attached to the element to a downstream point –a– on the surface of element 1A in the vicinity of the downstream ports 24. By maintaining the boundary layer attached in this fashion, the vortices generated in the vicinity of point a are able to grow sufficiently and to be shed downstream stably at regular intervals.

Conversely, the fluid flowing outwardly through upstream ports 21 and downstream ports 23 assists in separating the boundary layer of stream F2 from element 1A in the vicinity of upstream ports 21, and prevents the boundary layer from reattaching downstream to the vicinity of downstream ports 23.

As vortices are generated, the pressure and flow conditions depicted in FIG. 3 will reverse, so that fluid will flow inwardly through the ports 21 and 23 to maintain the boundary layer of stream F2 attached to the separating points –a'– in the vicinity of downstream ports 23, and fluid will flow outwardly through ports 22 and 24 to cause the boundary layer of stream F1 to separate in the vicinity of upstream ports 22.

Figure 4:
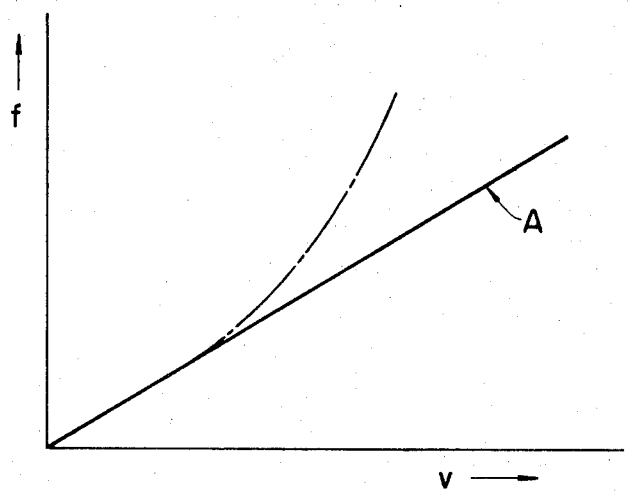
FIG. 4 is a graph relating flow velocity V and the frequency f of vortex production.

By arranging the openings on the opposite sides of element 1A in upstream and downstream regions as described, controlled boundary layer separation is afforded, and the linear relationship between flow velocity V and the frequency $f$ of vortex production is extended over a wider range despite turbulence in the flowing fluid F. This condition is indicated schematically in FIG. 4, wherein the solid curve represents the linear relationship achieved with the present invention, and the dashed curve represents the relationship between frequency $f$ and velocity V otherwise attainable.

Experimental results have shown improved boundary layer control when the upstream ports 21, 22 are at an angle $\theta_1$ in the range of 70° to 100°, and when the downstream ports 23, 24 are at an angle $\theta_2$ in the range of 100° to 140°. Preferred results are obtained when $\theta_1$ is approximately 85° and $\theta_2$ is approximately 115°.

Figure 5:
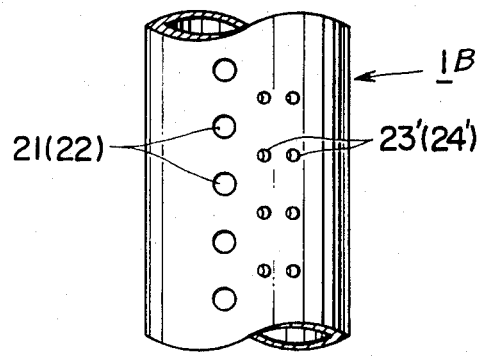
FIGS. 5 through 7 are partial elevations like FIG. 1 showing modified versions of the vortex generating element.
Figure 6:
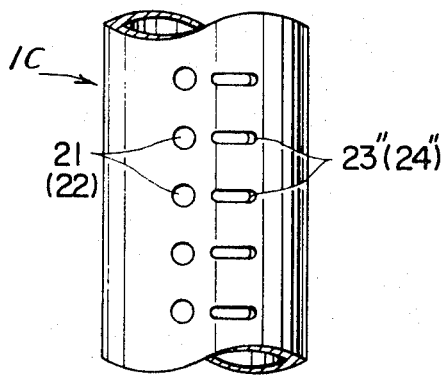
Figure 7:
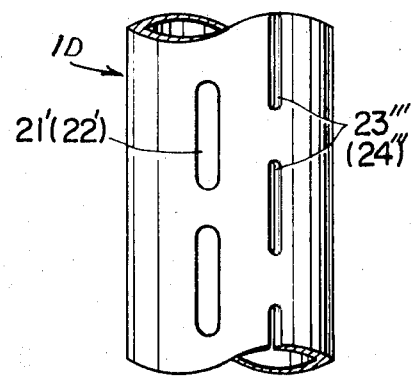

FIGS. 5 through 7 show alternate embodiments of the invention in which the openings in the upstream and downstream regions on opposite sides of the element are formed in different ways. FIG. 5 illustrates a vortex generating element 1B wherein the downstream openings are formed as double rows 23', 24' of circular ports staggered with respect to the upstream ports 21, 22. The vortex generating element 1C illustrated in FIG. 6 has the downstream openings provided by a row of slots 23'', 24'', extending parallel to the direction of flow and being arranged in alignment with the upstream ports 21, 22. FIG. 7 illustrates a vortex generating element 1D wherein the upstream openings are provided by a row of longitudinally extending slots 21', 22', and the downstream opening are provided by another row of longitudinally extending slots 23''', 24''', staggered with respect to the upstream slots and overlapping them.

Besides permitting linear flow measurement in turbulent conditions, the present invention has the advantage that it is less sensitive to positioning angle and can be easily and inexpensively constructed, the openings in the opposite sides of the vortex generating element being easily formed.

Although specific embodiments of the invention have been disclosed herein in detail, it is to be understood that this is for the purpose of illustrating the invention, and should not be construed as necessarily limiting the scope of the invention, since it is apparent that many changes can be made to the disclosed structure by those skilled in the art to suit particular applications.

We claim:

1. Flow metering apparatus of the type wherein a vortex generating element is placed transversely in a stream of fluid to produce on opposite sides of the element vortices which are shed in alternating fashion, and wherein the element is formed with openings along said opposite sides which are connected together through the interior of the element to produce therethrough an alternating fluid flow corresponding to the alternating shedding of vortices, such apparatus being characterized in that:

the openings on each of the opposite sides of the element are arranged relative to the stream of fluid both in an upstream region and in a downstream region spaced circumferentially from the upstream region such that the fluid flow inwardly through the spaced openings on one side of the element serves to maintain the boundary layer of the stream of fluid attached to the element to the vicinity of said downstream region, said fluid flowing outwardly through the spaced openings on the other side of the element serves to prevent reattachment of the separated boundary layer to the element.

2. Flow metering apparatus as claimed in claim 1 wherein the opening on each of the opposite sides of the element comprise a row of ports in said upstream region and a row of ports in said downstream region.

3. Flow metering apparatus as claimed in claim 2 wherein said downstream ports are smaller than the upstream ports.

4. Flow metering apparatus as claimed in claim 2 wherein said downstream ports are staggered in relation to the upstream ports.

5. Flow metering apparatus as claimed in claim 1 wherein said openings comprise elongate slots extending lengthwise of the element.

6. Flow metering apparatus as claimed in claim 5 wherein said openings on each of the opposite sides of the element comprise a row of elongate slots in said upstream region and a row of elongate slots in said downstream region.

7. Flow metering apparatus as claimed in claim 1 wherein the opening on each of the opposite sides of the element comprise elongate slots extending circumferentially of the element.

8. Flow metering apparatus as claimed in claim 7 wherein the openings on each of the opposite sides of the element comprise a row of ports in said upstream region and a row of circumferentially extending slots in said downstream region.

9. Flow metering apparatus as claimed in claim 1 wherein the openings arranged in said downstream region comprise adjacent rows of ports.

10. Flow metering apparatus as claimed in claim 1 wherein the openings arranged in said upstream region are located at an angle, measured from the openings to the element center to the element stagnation point, lying within the range of 70° to 100°, and the opening arranged in the downstream region are a similarly measured angle lying within the range of 100° to 140°.

11. Flow metering apparatus as claimed in claim 10 wherein the openings arranged in said upstream region are at an angle of approximately 85°, and the openings arranged in said downstream region are at an angle of approximately 115°.

12. Flow metering apparatus as claimed in claim 1 wherein said element is a right circular cylinder.

13. Flow metering apparatus as claimed in claim 1 wherein said element is formed with an interior chamber communicating with the fluid in said flowing stream through said openings in said upstream and downstream regions.

* * * * *

UNITED STATES PATENT OFFICE
CERTIFICATE OF CORRECTION

Patent No. 3,863,500            Dated February 4, 1975

Inventor(s) HIROO YAMASAKI and ICHIZO ITO

It is certified that error appears in the above-identified patent and that said Letters Patent are hereby corrected as shown below:

| | |
|---|---|
| Column 6, line 3 | "said" should read --and-- |
| Column 6, line 8 | "opening" should read --openings-- |
| Column 6, line 26 | "opening" should read --openings-- |
| Column 6, line 41 | "opening" should read --openings-- |
| Column 6, line 42 | After "are" insert --at-- |

Signed and sealed this 29th day of April 1975.

(SEAL)
Attest:

RUTH C. MASON
Attesting Officer

C. MARSHALL DANN
Commissioner of Patents
and Trademarks